(12) United States Patent
McDaniel et al.

(10) Patent No.: US 6,462,519 B1
(45) Date of Patent: Oct. 8, 2002

(54) AUTOMATIC POWER FACTOR CORRECTION SYSTEM

(76) Inventors: William D. McDaniel, 709 NE. Lindberg Dr., Oakview, MO (US) 64118; Gail A. McDaniel, 806 NE. Maple Dr., Oakview, MO (US) 64118; Timothy J. McDaniel, 808 NE. Maple Dr., Oakview, MO (US) 64118

( * ) Notice: Subject to any disclaimer, the term of this patent is extended or adjusted under 35 U.S.C. 154(b) by 0 days.

(21) Appl. No.: 09/874,690

(22) Filed: Jun. 5, 2001

(51) Int. Cl.[7] .................................................. G05F 1/70
(52) U.S. Cl. ........................................................ 323/211
(58) Field of Search .............................. 323/205, 207, 323/208, 209, 210, 211

(56) References Cited

U.S. PATENT DOCUMENTS

| | | | |
|---|---|---|---|
| 4,055,795 A | 10/1977 | Mathieu | |
| 4,204,150 A | 5/1980 | Mathieu | |
| 4,321,529 A | 3/1982 | Simmonds et al. | |
| 4,359,678 A | * 11/1982 | Raivola et al. | 323/211 |
| 4,417,196 A | 11/1983 | Cueto et al. | |
| 4,651,265 A | * 3/1987 | Stacey et al. | 363/35 |
| 4,771,225 A | * 9/1988 | Nishikawa | 323/211 |
| 4,891,569 A | 1/1990 | Light | |
| 5,461,303 A | 10/1995 | Leman | |
| 5,541,498 A | * 7/1996 | Beckwith | 323/211 |
| 5,736,838 A | * 4/1998 | Dove et al. | 323/211 |
| 5,751,138 A | * 5/1998 | Venkata et al. | 323/207 |
| 6,072,302 A | * 6/2000 | Underwood et al. | 322/17 |

* cited by examiner

*Primary Examiner*—Adolf Deneke Berhane
(74) *Attorney, Agent, or Firm*—Shughart Thomson & Kilroy, P.C.

(57) ABSTRACT

An automatic power factor correction system, for an electrical power installation drawing varying levels of reactive power, measures an electrical parameter of the power drawn by a load of a power installation which is capable of indicating a level of reactive power drawn by the load and couples a combination of capacitors to the power line to compensate for the level of reactive power indicated by the electrical parameter measured. A first embodiment of the system is based on a measured level of current and the effect on the measured level of current of adding compensating capacitors of selected capacitances to the power line. A second embodiment of the system is based on a measurement of phase angle of the power drawn and the addition of a calculated combination of capacitors to the power line to compensate for a measured level of reactive power.

25 Claims, 7 Drawing Sheets

AUTOMATIC POWER FACTOR CORRECTION SYSTEM

BACKGROUND OF THE INVENTION

The present invention relates to electrical power control circuitry and, more particularly, to an improved system for monitoring and correcting the power factor of a power installation.

Electrical power is an enormously versatile and convenient source of energy. However, there are costs in generating and distributing electrical energy, which tend to increase when demand for electrical power increases. For this reason, there is always a motivation for increasing the efficiency of electrical power transmission and utilization and, conversely, for reducing losses and wastes in the delivery and use of electrical energy.

Alternating current electrical power is characterized by a phase relationship between the current and voltage. Current lagging the voltage results from a preponderance of inductive loads, while current leading the voltage results from capacitive loads. An in-phase relationship results from resistive loads or a balance of inductive and capacitive loads. In-phase current results in "real" or resistive power, while out-of-phase current results in "apparent" or reactive power from the influence of inductive or capacitive reactance in the power circuit. A commonly used measure of the phase relationship between current and voltage is power factor, which is equal to the cosine of the phase angle therebetween. Power factor maximizes at a value of unity when the relationship is effectively resistive, is positive and less than one when inductive, and is negative and less than one when capacitive.

There tend to be more types of inductive loads connected to power lines than capacitive, such as electric motors, transformers, and the like. Power companies often impose surcharges on industrial power customers when their loads drive the power factor below a selected level. To avoid this, industrial users often connect power factor correcting capacitors to the power line along with their inductive loads to compensate and retain the power factor at an economic level.

In residential power installations, the majority of electrical energy consumed is in refrigeration, ventilation, air conditioning, lighting, and, in some cases, heating. Relatively small amounts of energy are also used for communications, computers, entertainment devices, and the like. Watt-hour meters typically used in residential and small business installations do not distinguish between real power and apparent power. Thus, the customer is charged for both, even though apparent power is not actually "consumed" for any purpose useful for the customer.

While there are power factor correcting systems available for large industrial power users, there have been no practical or economical devices for correcting power factors of residential and small business customers. Generally, industrial power factor correcting systems are associated with the equipment for which they are intended to compensate and are activated in coordination with such equipment. In the past, it has not been considered practical or economical for owners of residential property to install power factor correction devices for each possible inductive load. Additionally, inductive devices in residences tend to be activated at random times, for example, under the control of thermostats.

SUMMARY OF THE INVENTION

The present invention provides a system for correcting the power factor of small power installations, such as residences, apartments, small businesses, and the like. The system of the present invention generally includes a plurality of reactance units or capacitors which are selectively coupled to a power line and a sensor unit to determine if the capacitors connected to the power line have favorably affected the power factor.

In general, the present invention measures an electrical parameter of the power drawn by a load of a power installation which is capable of indicating a level of reactive power drawn by the load and couples a combination of reactance elements to the power line to substantially compensate for the level of reactive power indicated by the electrical parameter measured. The invention is directed to a first embodiment which is based entirely on a level of current measured and the effect of compensating reactance on the measured current level and a second embodiment which is based on a measurement of phase angle of the power drawn.

More particularly, the first embodiment of the power factor correction system of the present invention continually measures the current level drawn by the installation. When an increase in current is detected, it is assumed that a power load has been activated. A capacitor unit is connected to the power line, and the current measured again. If the current level increases, it is determined that capacitor unit has not favorably affected the power factor, and the capacitor is disconnected. If, on the other hand, connecting the capacitor caused the measured current to decrease, additional capacitance is connected to the power line. The process repeats until the current again rises, at which point, the most recently connected capacitor is disconnected.

In measuring the current drawn by loads within the power installation, the present invention averages a number of current measurements over time and takes no compensation action unless a change of a selected current difference is measured in less than a selected interval ov time. This approach, thus, reduces switching transients by making the system relatively immune to small variations in drawn current. In a preferred embodiment, the present invention bases compensating capacitance increments in multiples of a base capacitance which would result in a reactance that would draw about one ampere of current at the nominal power line frequency and voltage. The base capacitance is 22 microfarads for a power installation with a line frequency of 60 hertz and a nominal voltage of 110 volts.

The present invention maximizes the speed of arriving at a compensating combination of capacitors by providing a set of capacitors with values varying in powers of two multiplied by the base capacitance. The set of capacitors include: 1, 2, 4, 8 . . . 128 times the base capacitance. By this means, the power factor correction quickly arrives at an initial correction by doubling the value of compensating capacitance until the measured current level increases. In binary terms, this initial correction represents a "most significant digit". The process continues, by incrementing rather than doubling, until an optimum combination is determined, which also fills in the "less significant digits".

A typical installation of the present invention includes a set of eight compensating capacitors with values ranging in powers of two from 1 to 128 times the base capacitance of 22 microfarads. The compensating capacitors are connected through latching switches across the power line. The latching switches are interfaced to an eight-bit output port of a controller, such as a microprocessor or microcontroller. By this means, the controller can connect any one of 256 combinations of the capacitors across the power line or disconnect any or all of the capacitors from the power line by writing an appropriate binary word to the output port in which the bit content of the binary word corresponds to the combination of capacitors to be connected or disconnected.

In the second, phase based, embodiment of the present invention, both current and voltage and the phase relationship therebetween are continually measured. The amount of compensating capacitance value to reduce the phase angle to near zero is calculated. Then a combination of capacitors which roughly equals the compensating capacitance value is coupled to the power line to compensate for the sensed inductive loads. The second embodiment of the present invention employs the same set of capacitors and, in general, the same apparatus as the first embodiment. Thus, the second embodiment uses a set of capacitors whose capacitance values are multiples of a base capacitance which would result in a reactance that would draw one ampere of current at the nominal line frequency and voltage. The set of capacitors also vary in value in powers of two multiplied by the base capacitance.

Other objects and advantages of this invention will become apparent from the following description taken in relation to the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates an apparatus and 2 a method for automatically correcting the power factor of a power installation 3 (FIG. 2) drawing a variable level of reactive power at random times from a power line 4. In general, the present invention measures an electrical parameter of the power drawn by a load 5 (FIG. 2) of a power installation 3 which is capable of indicating a level of reactive power drawn by the load and couples a combination of reactance elements 6 to the power line 4 to substantially compensate for the level of reactive power indicated by the electrical parameter measured.

Figure 1:
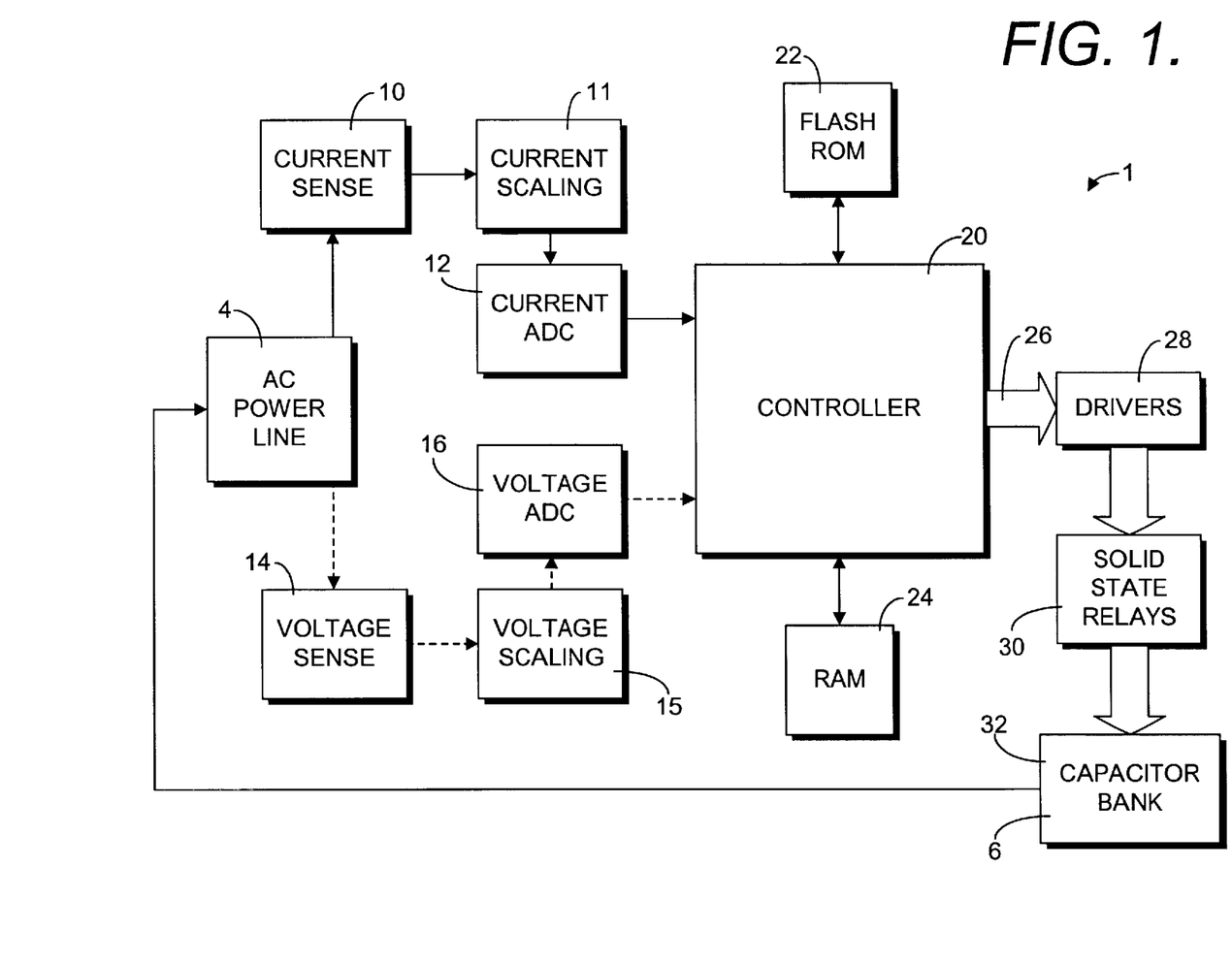
FIG. 1 is a block diagram illustrating the principal components of an automatic power factor correction system which embodies the present invention.

Referring to FIG. 1, the power factor correction apparatus 1 includes current sensing circuitry 10 with output processed by current scaling circuitry 11 for input to a current analog to digital converter (ADC) 12. The current sensing circuitry 10 may be, for example, a conventional type of clamp-on current sensor which electromagnetically couples to a set of AC power conductors for measuring current flow therethrough. The current scaling circuitry 11 may be a voltage or current divider network which reduces the measured level to a convenient range for input to the current ADC 12. The output of the current ADC 12 is a digital word having a binary value which is proportional to the measured level of current flowing in the power line 4.

The illustrated apparatus 1 may also include voltage sensing circuitry 14, voltage scaling circuitry 15, and a voltage analog to digital converter (ADC) 16. The voltage sensing circuitry 14 preferably is connected directly across the power line 4 and includes scaling circuitry 15, such as a voltage divider network, which scales the voltage sensed to a desired level for processing by the voltage ADC 16. The manner of connections of the current sensing circuitry 10 and the voltage sensing circuitry 14 form a basis for measuring the phase of power flowing in the power line 4. The current sensing circuitry 10 is electromagnetically coupled to the power line 4 and, thus, its readings track the value of current flowing in the power line 4. on the other hand, the voltage sensor 14 is conductively connected to the power line 4 and is, thus, affected by the voltage across the power line. The voltage sensing elements 14, 15 and 16 need not be present in the first embodiment of the apparatus 1. The clamp-on type current sensor 10, since it is inductive in nature, adds a small phase shift of its own, which may introduce some error in a phase determination. However, such shift is constant and may be masked by measurement scaling steps, as will be detailed below. Alternatively, other types of current sensing elements not requiring inductive coupling could also be employed, such as a Hall effect based current sensor. The current sensor 10 and voltage sensor 14 also preferably incorporate half wave rectifiers.

The current ADC 12 and, if present, the voltage ADC 16 are interfaced to ports of a controller 20, which may be a microprocessor, a microcontroller, or the like. The illustrated controller 20 includes flash programmable ROM (read-only memory) 22 which stores programs and fixed data and RAM (read/write memory) 24 which stores temporary data. The controller 20 may be implemented by any of a number of known types of embedded microprocessors, microcontrollers, and the like. The controller 20 may, for example, be one of the PIC16F87X series of microcontrollers manufactured by Microchip Technology, Inc. (www.microchip.com). The controller 20 includes a parallel port 26 which is interfaced through a set of drivers 28 and solid state relays or latching switches 30 to a plurality of capacitors 32 of a capacitor bank 6.

Figure 2:
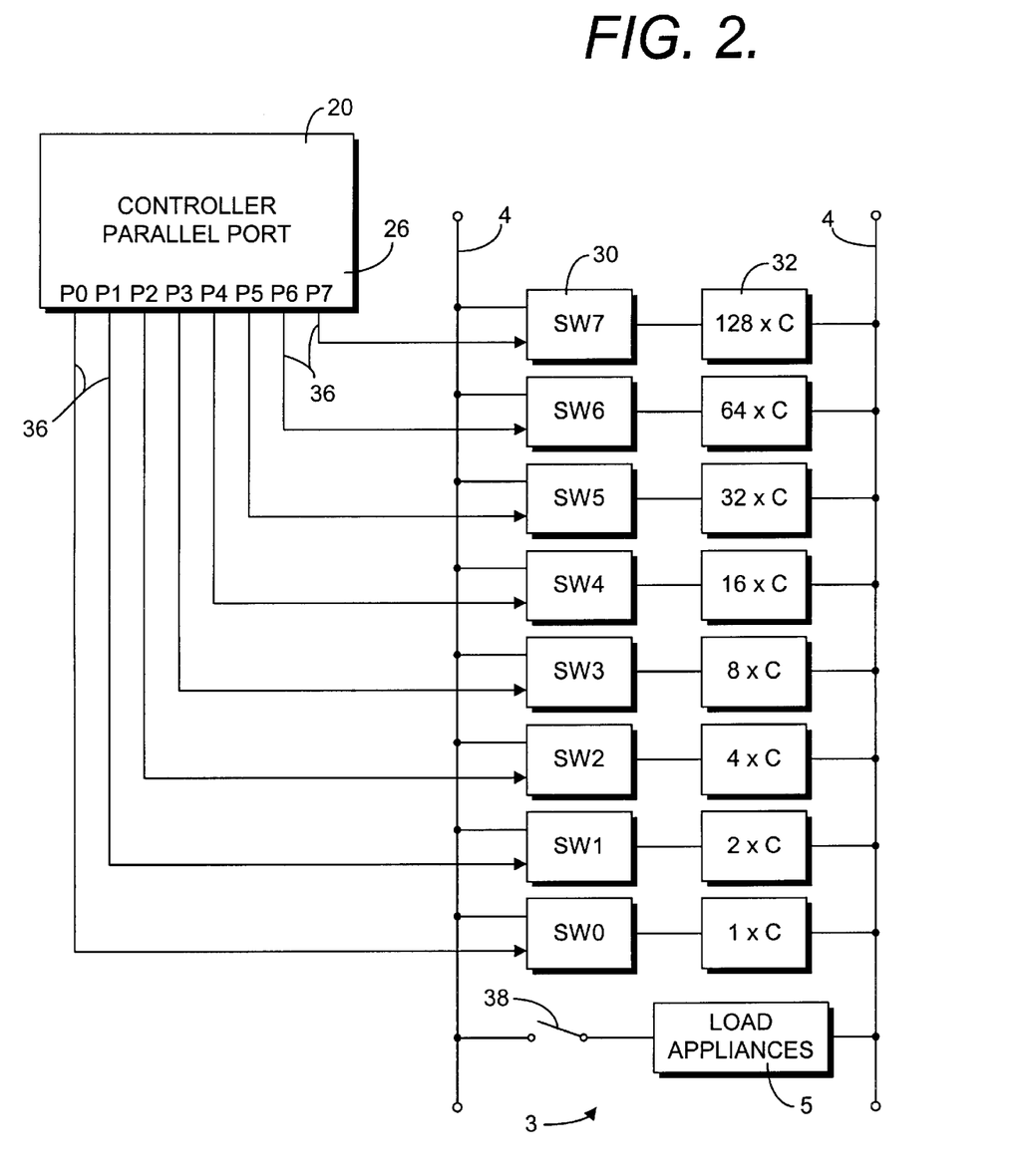
FIG. 2 is a block diagram illustrating a capacitor bank of the automatic power factor correction system.

FIG. 2 illustrates details of the capacitor bank 6 and the manner of interfacing the capacitors 32 of the bank 6 to the port 26 of the controller 20. The port 26 is illustrated as having eight bits 36 labeled P0 through P7. Each bit 36 is connected through a latching switch 30 to a specific capacitor 32. The capacitors 32 are shown as having values (1×C) through (128×C), varying in powers of two or doubling. The value "C" is selected as the value of capacitance which will form a capacitive reactance which will draw approximately one ampere of current at the nominal line frequency and line voltage of the power line 4. The value of "C" is 22 microfarads for a line frequency of 60 hertz and a nominal AC line voltage of 110 volts.

By use of such a set of capacitors 32, the compensation resolution of the apparatus 1 is one ampere of correction. The set of capacitors 32 in the illustrated capacitor bank 6, and activated in the matter illustrated in FIG. 2, can provide any capacitance value from zero to 255 times "C", in increments of "C". The controller 20 simply writes a binary word to the port 26 in which the binary content of the word corresponds to the capacitors 32 it has been determined require coupling to the power line 4. The drivers 28 provide isolation and driving current to operate the solid state relays 30, such as triacs, SCR's, or the like. The relays or switches 30, or the drivers 28, preferably have latching capability so that the most recent state of activation written to the port 26 is maintained until changed by a new word from the controller 20. The apparatus 1 may be set up to use either a positive logic, in which a logic one activates the switches 30, or a negative logic, in which a logic zero activates the switches 30.

Each set of a capacitor 32 and its latching switch 30 is connected across the power line 4. In a physical embodiment of the capacitor bank 6 shown, the sets of capacitors 32 with latching switches 30 can be connected in parallel and simply plugged into a convenient outlet of the power installation 3, preferably in close proximity to a distribution box (not shown) of the installation 3. FIG. 2 shows appliances 5 which are connected by respective appliance switches 38 to the power line 4.

Figure 3:
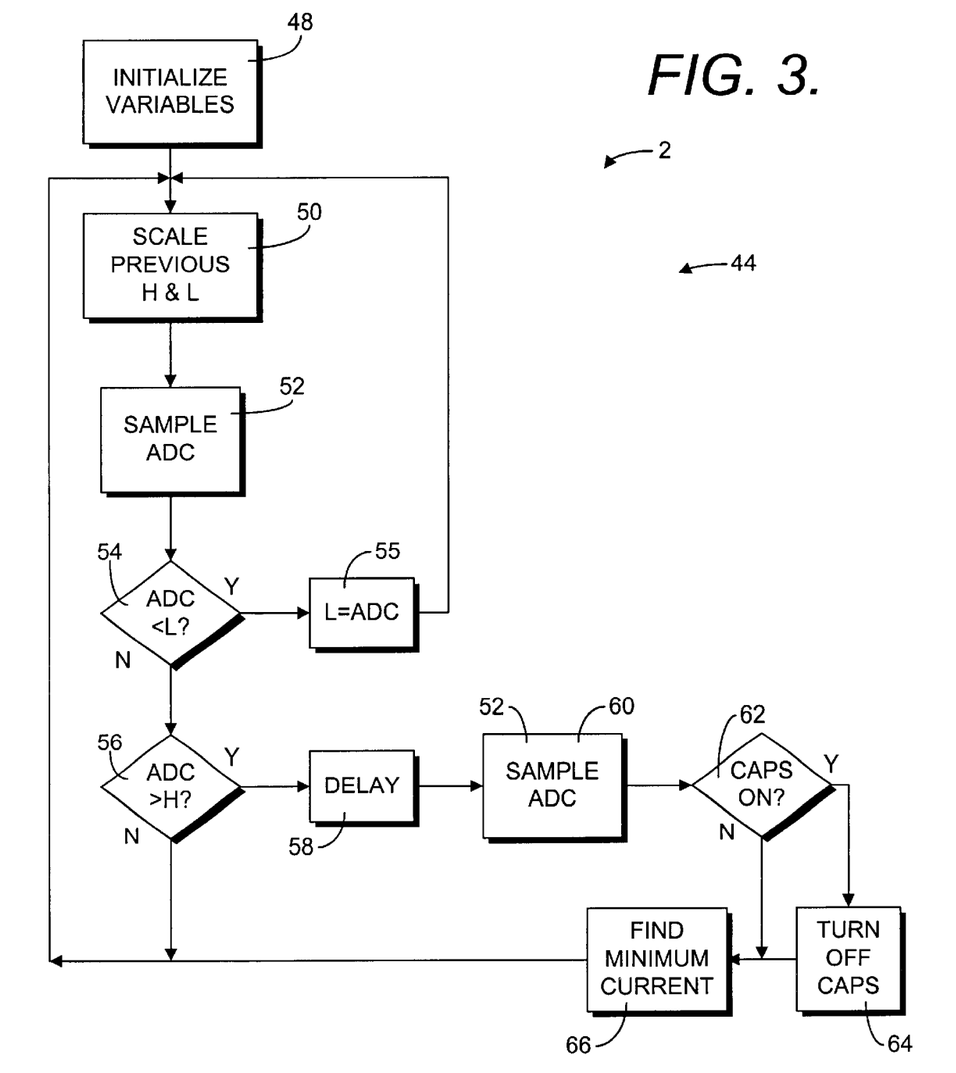
FIG. 3 is a flow diagram illustrating process steps of a main current based routine of the automatic power factor correction system.

FIG. 3 illustrates a main routine of a current level based embodiment 44 of the power factor correction method 2 of the present invention. The current method 44 is a successive approximation approach to compensating for reactive power drawn by the loads 5 of the power installation 3. Generally, current is measured and compared to a previously measured current level. If the difference is significant, capacitors 32 are activated until the current increases. At that point, the method 44 reverts to the capacitance level just prior to the level which caused an increase in current drawn. The method 44 is based on the fact that a certain amount of capacitance connected across the power line 4 compensates for the inductive power drawn by the loads 5 and, thus, reduces the total current drawn. When the optimum capacitance level is exceeded, the phase angle becomes capacitive, which causes the current level to increase. The process 44, thus, reverts to the optimum capacitance level.

Referring to FIG. 3, at step 48, all variables are initialized and, at step 50, previously measured high and low current levels (H and L) are scaled as desired. For example, in step 50, the previous low and high levels may be set to a define a minimum increment to be considered. At step 52, the current ADC 12 is sampled, as will be detailed in reference to FIG. 4. A resulting average current value, ADC, is compared to the previous low (L) at test 54. If ADC is less than the scaled previous low, the previous low L is set to the current average at step 55, ADC, and the process loops back to repeat steps 50, 52, and 54. If the average ADC exceeds the previous high H at test 56, a settling delay interval is observed at step 58 and the current ADC 12 is sampled again at step 60. If any capacitors 32 are currently activated, as determined by test 62, such capacitors 32 are switched out at 64, by writing a null word (00000000) to the port 26, and the capacitors 32 are successively switched back into parallel with the power line 4 in a find minimum current step 66 (FIG. 5) until the measured current increases.

Figure 4:
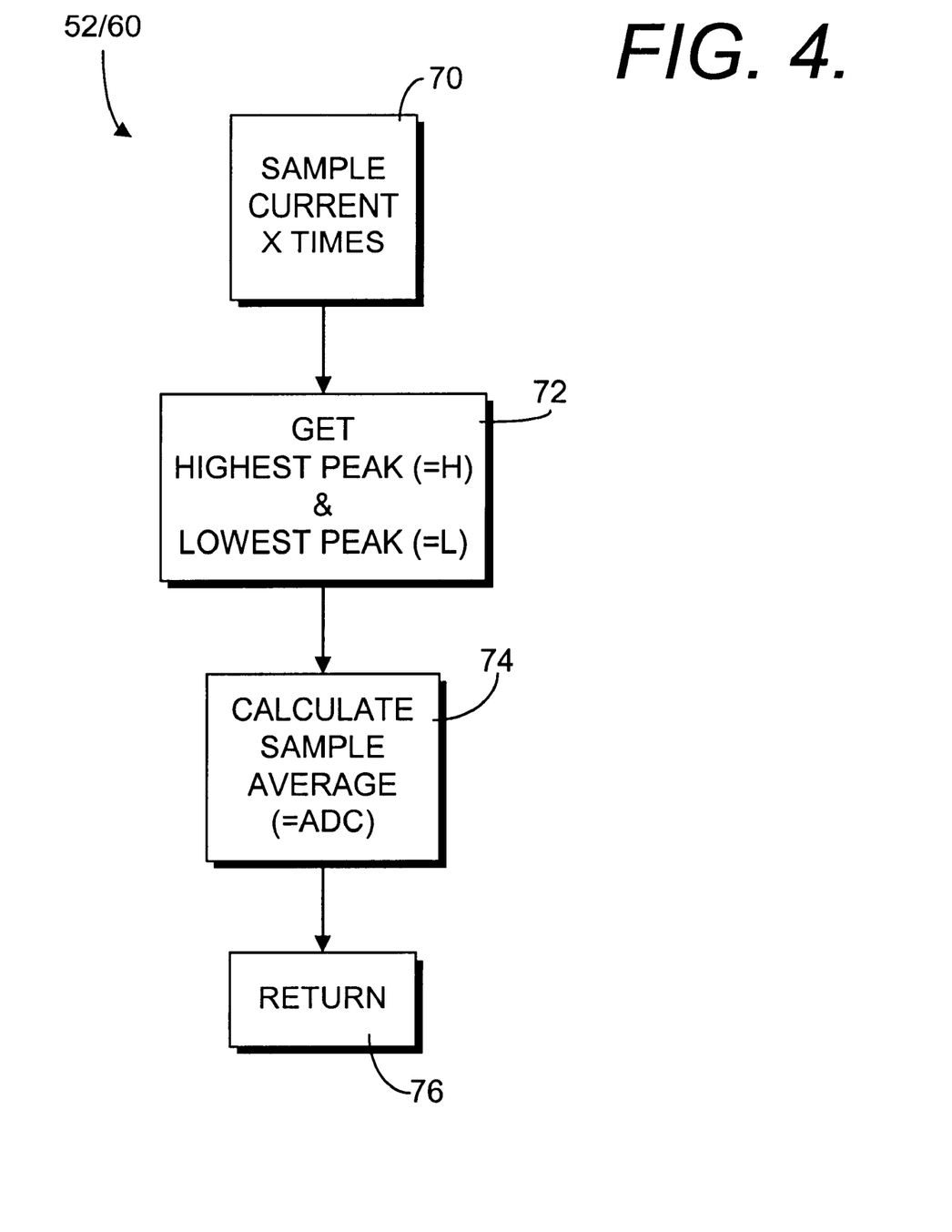
FIG. 4 is a flow diagram illustrating process steps of a routine of the present invention for measuring current drawn by an electrical power installation.

Referring to FIG. 4, the sample ADC routine 52/60 is shown. A current value proportional to current drawn through the power line 4 by the loads 5 is sampled a selected number of times at step 70. The number of times current is sampled depends on the speed of the controller 20 and the overall processing requirements of the process 44. From the set of samples generated in step 70, a highest peak H and a lowest peak L are selected at step 72. The peaks refer to the sinusoidal peaks of the waveform of the current on the power line 4. Also, an average of the set of samples is calculated at step 74 and stored as "ADC". The routine 52/60 returns at step 76 to the calling process 44 with variables H, L, and ADC. Hereafter, all process steps labeled "sample ADC" will function in the manner detailed with reference to steps 52/60.

Figure 5:
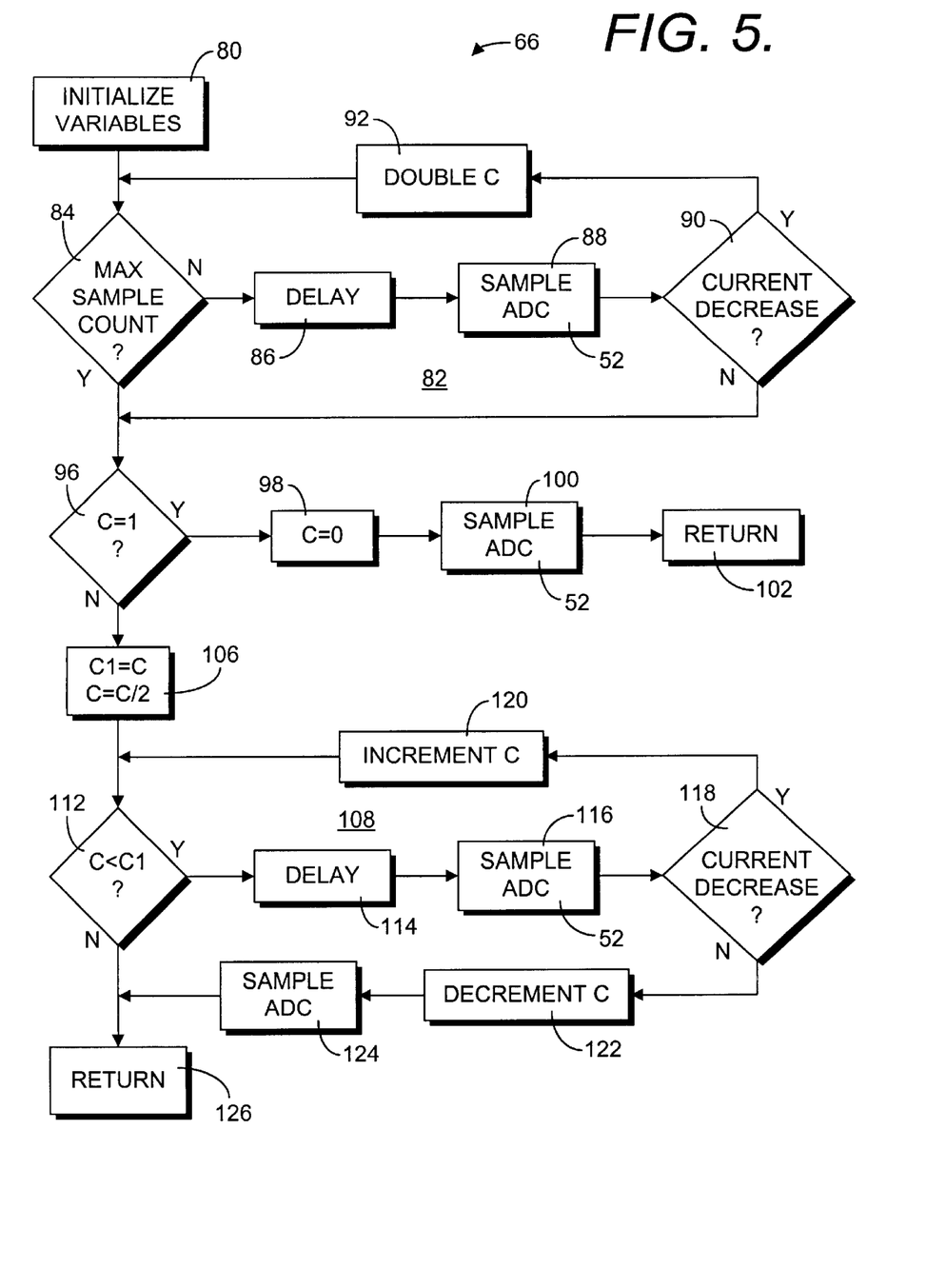
FIG. 5 is a flow diagram illustrating process steps of an incremental current based routine for correcting power factor according to the present invention.

FIG. 5 illustrates the routine 66 for actually correcting the power factor of the power line 4 under the influence of current drawn by appliances 5. Variables for the routine 66 are initialized at step 80, followed by an initial current minimizing loop 82. A test at 84 determines if every one of the capacitors 32 has been tried. It is unlikely that all of the capacitors 32, with values as shown in FIG. 2, will be cycled through. The highest value capacitor 32 in the bank 6 has a value of 128 times 22 microfarads and, as such, represents a correction of 128 amperes of reactive current. The great majority of residential power installations do not exceed 100 amperes of service. If the loop count has not been exceeded at 84, a settling delay is observed at step 86, followed by a "sample ADC" step 88, as previously detailed with reference to steps 52 and 60. At test 90, it is determined if the measured current has decreased. If so, the capacitance is doubled at step 92, and the loop 82 repeated. It should be noted that on the first occurrence of loop 82, the lowest value (1 times C) is connected across the power line 4 at step 92.

If the current does not decrease at test 90, that is, if it increases, a test at 96 determines if only the first capacitor increment (1 times C) has been tried. If so, the capacitance value (1×C) is disconnected at step 98, the current ADC 12 is sampled at step 100, and the routine 66 returns at step 102 to the calling process 44. If any capacitor 32 other than (1×C) has been connected, that value is halved at step 106 to revert to the previous level of capacitance before the current increased at test 90 and the value of C1 (equal to the value of capacitance before halving) is saved, and a final current minimizing loop 108 is entered.

At each round of the loop 108, a test is conducted at 112 to determine if the current value of capacitance is less than the value of capacitance resulting from loop 82. If so, a settling delay 114 is waited out, a sampling of the current ADC 12 at step 116, and a current decrease step at 118 are executed. If the measured current decreases at test 118, the capacitance value is incremented by a value of "C" at step 120. If the current level does not decrease at test 118, the value of capacitance is decremented at step 122, current level is sampled at step 124, and the routine 66 returns at 126 to the calling process 44. If the loop 108 repeats until the test at 112 returns an "untrue", the routine 66 also returns at 126, since the maximum value of compensating capacitance has been attempted through loop 108 without increasing the measured current.

Figure 6:
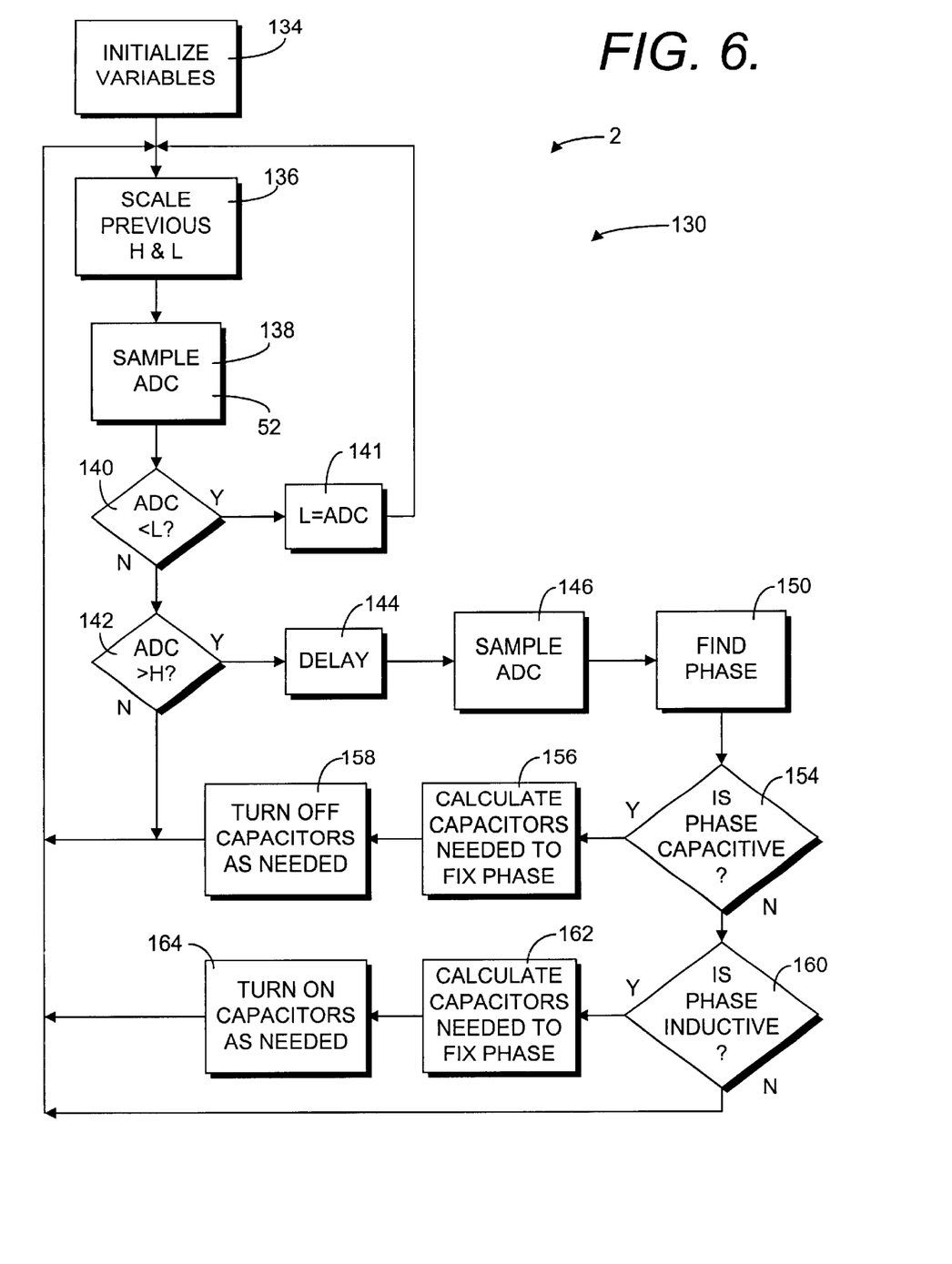
FIG. 6 is a flow diagram illustrating an alternative embodiment of the automatic power correction system of the present invention which is based on direct phase measurement of power drawn by an electrical power installation.

FIG. 6 illustrates an alternative phase based embodiment 130 of the power factor correction method of the present invention. The process 130 is capable of measuring a varying level of phase shift in the power line 4 caused by randomly activated appliances 5 of a power installation 3, determine a combination of capacitors 32 to compensate for the reactive phase relationship of the power, and cause the combination to be coupled to the power line 4 to return the phase relationship of the power line 4 to a substantially resistive, or at least minimized, phase angle.

The phase based power factor correction process 130 begins similar to the process 44 with initialization of variables at step 134, scaling previously determined H and L current measurements at step 136, and sampling the current ADC 12 at step 138. The step 138 is substantially similar to the sample ADC step 52 described in relation to the process 44. Tests 140 and 142 are similar to tests 54 and 56 of the process 44 and determine if the currently measured current is significantly different in level from previously measured current levels. If the currently measured current level is less than the previous low peak L at test 140, the L value is replaced with the new ADC current value at step 141, and steps 136 and 138 are repeated. If the ADC value is not greater than the previously measured high peak H at test 142, the steps 136 and 138 are repeated. In the illustrated process 130, unless a selected change in measured current level is detected by the tests 140 and 142, the process 130 does not make an attempt to correct power the factor.

If the test 142 is true, after a settling delay at step 144, the current ADC 12 is sampled at 146, and a "find phase" routine 150 is entered, as will be detailed with reference to FIG. 7. If the find phase routine 150 determines the phase to be capacitive, as determined by test 154, the process 130 calculates the combination of capacitors 32 to minimize the measured phase angle at step 156, and at step 158 turns off capacitors as needed to correct the phase. In practice, steps 156 and 158 may be needed if an appliance 5 is turned off, leaving the power installation 3 over-corrected by the capacitor bank 6. If the routine 150 determines the phase to be inductive, as shown by test 160, at step 162 the process 130 calculates the combination of capacitors 32 required to correct the phase, and at step 164 turns on the combination of capacitors 32 determined from step 162.

Figure 7:
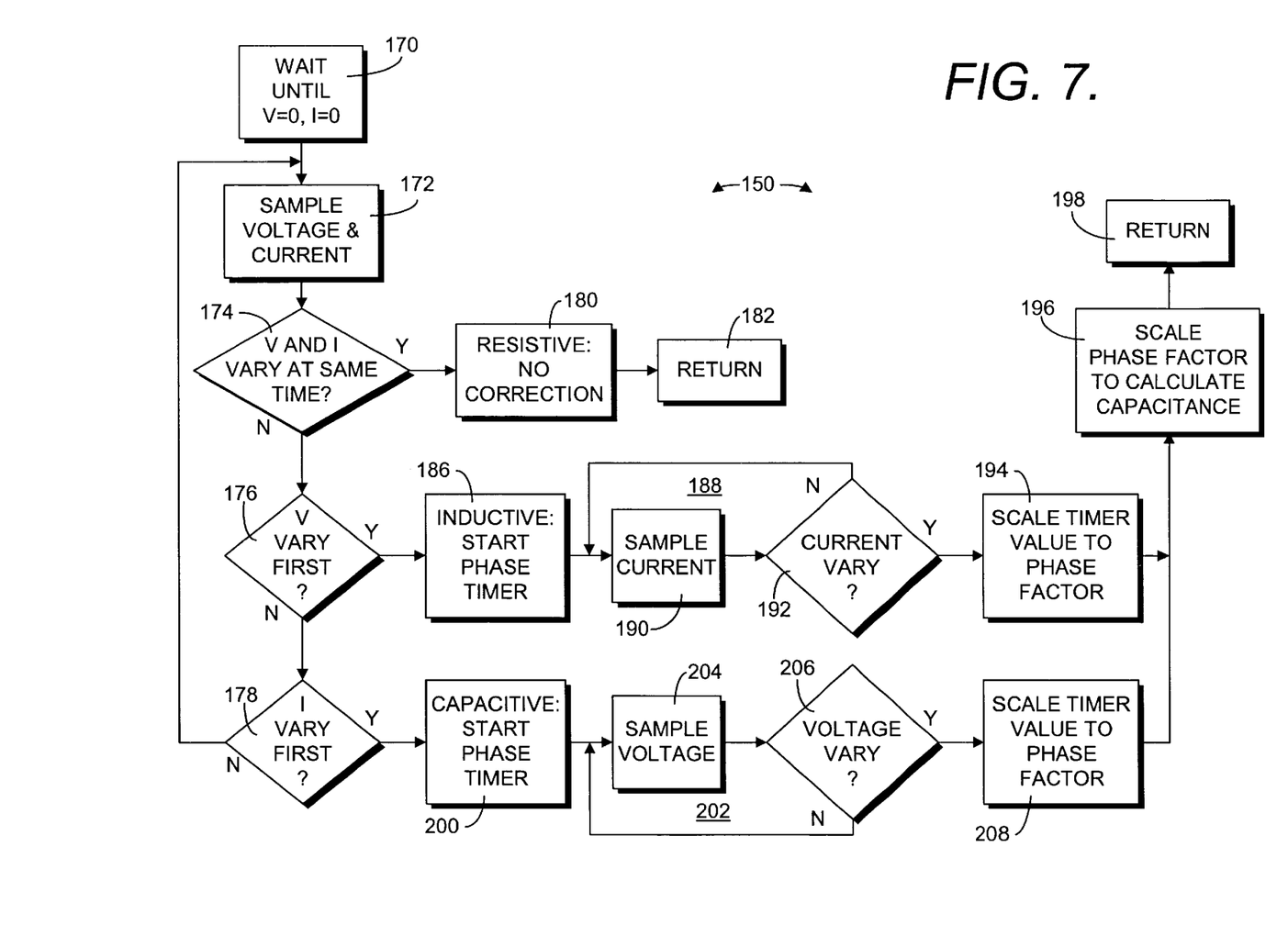
FIG. 7 is a flow diagram illustrating steps of a routine for phase measurement within the alternative phase based embodiment of the present invention.

Referring to FIG. 7, the find phase routine 150 waits at step 170 for both the voltage and current, as measured by the sensors 14 and 10, to go to zero, then samples both voltage and current at step 172 by way of the ADC's 16 and 12. At tests 174, 176, and 178, the process 150 determines if the voltage and current change simultaneously at test 174, the voltage changes first at test 176, or the current varies first at test 178. If the voltage and current vary substantially simultaneously, within a selected window of time, the phase relationship of the power line 4 is determined to be resistive at step 180, and the process returns at step 182 to give "no" answers to tests 154 and 160.

If the voltage varies first, as determined by the test 176, the phase relationship is determined to be inductive at step 186, and a phase timer is started. During a phase timing loop 188, the current is sampled repeatedly at step 190, via the current ADC 12, until the test 192 determines that the current has also changed. At that point, the phase timer value is obtained and scaled to a phase factor at step 194. The phase factor indicates whether the phase correction need is an inductive correction or a capacitive correction. The phase factor is also proportional to the value of correction needed, as scaled at step 196. Thereafter, the routine 150 returns at step 198 to the process 130.

In a similar manner, if test 178 determines that the current varied first, it is determined that the phase relationship is capacitive at step 200, and the phase timer is started. A phase timer loop 202 repeatedly samples the voltage at step 204, via the voltage ADC 16, until test 206 indicates that the voltage has changed. At step 208, the final timer value is scaled to a phase factor at step 210 which, in turn, is scaled to a corrective capacitance value at step 196. The routine 150 then returns at 198 to the process 130.

The processes 44 and 130, along with supporting routines 52, 66, and 150 are continuing processes which continually measure either current flow or current flow and phase relationship of the power line 4 and couple combinations of the capacitors 32 to the power line 4 to compensate for any detected non-resistive power factor detected, within the resolution of the hardware and software employed. The processes 44 and 130 are self-starting and require no entry of initial settings if the apparatus 1 is powered down or otherwise interrupted. The apparatus 1 does not require a backup battery, but may derive its operating power from the power line 4 using a power supply (not shown). The solid state relays/latches 30 are preferably configured that if operating power thereto is interrupted, the relays 30 open, such that the correcting capacitors 32 are only coupled power is supplied to the remainder of the apparatus 1 is capable of operating. Thus, the apparatus 1 is essentially fail-safe.

It is to be understood that while certain forms of the present invention have been illustrated and described herein, it is not to be limited to the specific forms or arrangement of parts described and shown.

What is claimed and desired to secure by Letters Patent is:

1. A power factor correction apparatus for power factor correcting an electrical installation including a power line having coupled thereto a load drawing AC electrical power including a potentially variable level of reactive power, said apparatus comprising:
   (a) a power sensor coupled to said power line and operative to measure an electrical parameter of electrical power drawn by said load, said parameter being capable of indicating a level of reactive power drawn by said load;
   (b) a plurality of reactance elements;
   (c) switching circuitry controllable to couple said reactance elements to said power line individually or in selected combinations; and
   (d) a controller interfaced to said sensor and said switching circuitry and operative, in response to a level of reactive power indicated by said electrical parameter, to cause said switching circuitry to couple an appropriate combination of said reactance elements to said power line to thereby substantially compensate for said level of reactive power indicated by said electrical parameter.

2. An apparatus as set forth in claim 1 wherein said electrical parameter includes:
   (a) a value proportional to a level of current drawn by said load.

3. An apparatus as set forth in claim 1 wherein said electrical parameter includes:
   (a) a value proportional to an electrical phase angle of said electrical power drawn by said load.

4. An apparatus as set forth in claim 1 wherein said reactance elements include:
   (a) a plurality of capacitors.

5. An apparatus as set forth in claim 1 wherein said reactance elements include:
   (a) a set of capacitors of capacitance values varying in powers of two from a minimum capacitance value to a maximum capacitance value.

6. An apparatus as set forth in claim 1 wherein said reactance elements include:
   (a) a plurality of capacitors, each capacitor having a capacitance value which is a multiple of a base capacitance value; and
   (b) said base capacitance value is that capacitance value which results in a reactance which draws substantially one ampere at a nominal line frequency and line voltage of said power line.

7. An apparatus as set forth in claim 1 wherein:
   (a) said controller includes a digital port formed by a specific plurality of port terminals;
   (b) said switching circuitry includes latching elements which couple each of said reactance elements to specific ones of said port terminals; and
   (c) said controller causes selected ones of said reactance elements to be coupled to said power line by writing to said port a multiple bit binary word having a bit content corresponding to said selected ones of said reactance elements.

8. An apparatus as set forth in claim 1 and including:
   (a) said electrical parameter including a level of current drawn by said load;
   (b) said reactance elements including a plurality of capacitors, each capacitor having a capacitance value which is a multiple of a base capacitance value;
   (c) said base capacitance value being that capacitance value which results in a reactance which draws substantially one ampere at a selected nominal line frequency and a selected nominal line voltage of said power line; and
   (d) said set of capacitors having capacitance values varying by powers of two from said base capacitance value to a maximum capacitance value.

9. An apparatus as set forth in claim 8 wherein said electrical parameter further includes:
   (a) a second value substantially proportional to an electrical phase angle of said electrical power drawn by said load.

10. An apparatus as set forth in claim 8 wherein:
    (a) said controller includes a digital port formed by a specific plurality of port terminals;
    (b) said switching circuitry includes latching elements which couple each of said capacitors to specific ones of said port terminals; and
    (c) said controller couples selected ones of said capacitors to said power line by writing to said port a multiple bit binary word having a bit content corresponding to said selected ones of said capacitors.

11. A method for power factor correcting an electrical power installation including a power line having coupled thereto a load drawing AC electrical power including a potentially variable level of reactive power, said method employing reactance elements and comprising the steps of:
    (a) automatically measuring an electrical parameter of power drawn by said load, said electrical parameter being capable of indicating a level of reactive power drawn by said load; and
    (b) automatically coupling an appropriate combination of said reactance elements to said power line to thereby substantially compensate for said level of reactive power indicated by said electrical parameter.

12. A method as set forth in claim 11 wherein said step of measuring an electrical parameter includes the step of:
    (a) measuring a value substantially proportional to a level of current drawn by said load.

13. A method as set forth in claim 11 and including the steps of:
    (a) measuring a value substantially proportional to a level of current drawn by said load;
    (b) coupling a reactance element to said power line;
    (c) repeating said measuring and coupling steps to thereby couple an increasing level of reactance to said power line until said level of current increases; and
    (d) thereafter, reverting to that level of reactance coupled to said power line just prior to said level of current increasing.

14. A method as set forth in claim 11 wherein said coupling step includes:
    (a) coupling one or more capacitors to said power line.

15. A method as set forth in claim 11 wherein said coupling step includes the step of:
    (a) coupling one or more of a set of capacitors to said power line, said set of capacitors having capacitance values varying in powers of two from a minimum capacitance value to a maximum capacitance value.

16. A method as set forth in claim 11 wherein said coupling step includes the step of:
    (a) coupling one or more of a set of capacitors to said power line, each capacitor having a capacitance value which is a multiple of a base capacitance value, and said base capacitance value being that capacitance value which results in a reactance which draws substantially one ampere at a selected nominal line frequency and a selected nominal line voltage of said power line.

17. A method as set forth in claim 11 and including the steps of:
    (a) providing a controller including a digital port formed by a specific plurality of port terminals and switching circuitry including latching elements which couple each of reactance elements to specific ones of said port terminals; and
    (b) said controller effecting coupling of said appropriate combination of said reactance elements to said power line by writing to said port a multiple bit binary word having a bit content corresponding to said appropriate combination of said reactance elements.

18. A method as set forth in claim 11 wherein said step of measuring an electrical parameter includes the step of:
    (a) measuring a value substantially proportional to an electrical phase angle of said electrical power drawn by said load.

19. A method as set forth in claim 11 and including the steps of:
    (a) measuring a value substantially proportional to an electrical phase angle of said electrical power drawn by said load;
    (b) automatically calculating a compensating reactance value to minimize said electrical phase angle of said electrical power; and
    (c) automatically controlling coupling to said power line said appropriate combination of reactance elements substantially comparable to said compensating reactance value.

20. A method for power factor correcting an electrical power installation including a power line having coupled thereto a load drawing AC electrical power including a potentially variable level of reactive power, said method comprising the steps of:

(a) automatically measuring a current value substantially proportional to a level of current drawn by said load; and (b) coupling a capacitor having a selected capacitance to said power line;

(c) repeating said measuring and coupling steps to thereby couple an increasing level of capacitance to said power line until said level of current increases;

(d) thereafter, reverting to that level of capacitance coupled to said power line just prior to said level of current increasing.

21. A method as set forth in claim 20 and wherein said coupling step includes the step of:

(a) coupling one or more of a set of capacitors to said power line, said set of capacitors having capacitance values varying in powers of two from a minimum capacitance value to a maximum capacitance value.

22. A method as set forth in claim 20 wherein said coupling step includes the step of:

(a) coupling one or more of a set of capacitors to said power line, each capacitor having a capacitance value which is a multiple of a base capacitance value, and said base capacitance value being that capacitance value which results in a reactance which draws substantially one ampere at a selected nominal line frequency and a selected nominal line voltage of said power line.

23. A method for power factor correcting an electrical power installation including a power line having coupled thereto a load drawing AC electrical power including a potentially variable level of reactive power, said method comprising the steps of:

(a) measuring a phase value substantially proportional to an electrical phase angle of said electrical power drawn by said load;

(b) automatically calculating a compensating reactance value to minimize said electrical phase angle of said electrical power; and (c) automatically controlling coupling to said power line a combination of capacitors to result in a reactance value substantially comparable to said compensating reactance value.

24. A method as set forth in claim 23 wherein said coupling step includes the step of:

(a) coupling one or more of a set of capacitors to said power line, said set of capacitors having capacitance values varying in powers of two from a minimum capacitance value to a maximum capacitance value.

25. A method as set forth in claim 23 wherein said coupling step includes the step of:

(a) coupling one or more of a set of capacitors to said power line, each capacitor having a capacitance value which is a multiple of a base capacitance value, and said base capacitance value being that capacitance value which results in a reactance which draws substantially one ampere at a selected nominal line frequency and a selected nominal line voltage of said power line.

* * * * *